(12) United States Patent
Sonoda et al.

(10) Patent No.: US 8,730,560 B2
(45) Date of Patent: May 20, 2014

(54) ELECTROPHORETIC DISPLAY DEVICE

(75) Inventors: Daisuke Sonoda, Chiba (JP); Tetsuya Nagata, Chiba (JP); Masataka Okamoto, Chonan (JP); Yasukazu Kimura, Chiba (JP); Toshio Miyazawa, Chiba (JP); Toshiki Kaneko, Chiba (JP); Hidekazu Nitta, Chiba (JP)

(73) Assignees: Japan Display Inc., Tokyo (JP); Panasonic Liquid Crystal Display Co., Ltd., Hyogo (JP)

( * ) Notice: Subject to any disclaimer, the term of this patent is extended or adjusted under 35 U.S.C. 154(b) by 297 days.

(21) Appl. No.: 13/252,536

(22) Filed: Oct. 4, 2011

(65) Prior Publication Data

US 2012/0087003 A1 Apr. 12, 2012

(30) Foreign Application Priority Data

Oct. 6, 2010 (JP) ................................. 2010-226527

(51) Int. Cl.
*G02B 26/00* (2006.01)
*G09G 3/34* (2006.01)

(52) U.S. Cl.
USPC .......................................... 359/296; 345/107

(58) Field of Classification Search
USPC ................................ 359/296; 345/43, 85, 107
See application file for complete search history.

(56) References Cited

U.S. PATENT DOCUMENTS

2006/0279525 A1* 12/2006 Matsuda ........................ 345/107

FOREIGN PATENT DOCUMENTS

| JP | 2007-47208 | 2/2007 |
| JP | 2008-83450 | 4/2008 |

* cited by examiner

*Primary Examiner* — Evelyn A. Lester
(74) *Attorney, Agent, or Firm* — Antonelli, Terry, Stout & Kraus, LLP.

(57) ABSTRACT

A pixel is formed by sealing an insulating liquid and floating particles in an area defined by a first substrate, a second substrate and partitions. The width of the partition has to be reduced in order to improve the pixel brightness by enlarging a flat electrode. In this case, the height of the partition has to be reduced for retaining the mechanical strength. If the height of the partition is reduced, an area of the partition electrode becomes small, thus failing to retain the memory effect. The planar surface of the partition is then formed into a zigzag shape so as to increase the area of the partition electrode.

4 Claims, 6 Drawing Sheets

ELECTROPHORETIC DISPLAY DEVICE

CLAIM OF PRIORITY

The present application claims priority from Japanese Patent Application JP 2010-226527 filed on Oct. 6, 2010, the content of which is hereby incorporated by reference into this application.

TECHNICAL FIELD

The present invention relates to a display device, and more particularly, to an electrophoretic display device.

BACKGROUND

The electrophoretic display device is configured to generate an image by moving a charged particle (floating particle) for each pixel. The electrophoretic display device may be formed into a thin and light-weight structure with less power consumption. Unlike the liquid crystal display device, the electrophoretic display device employs no polarization plate, which is advantageous in view of brightness. The device further ensures to keep high contrast when it is used outdoors.

Various types of electrophoretic display device have been developed. Japanese Unexamined Patent Application Publication No. 2007-47208 discloses an electrophoretic display device which generates an image by moving floating particles between a flat electrode and a partition electrode for each pixel. According to the document, the resistance film with a sheet resistance ranging from $10^2 \Omega$ to $10^{15} \Omega$ is used as the electrode which attracts the floating particles so as to accelerate movement thereof and increase the response speed.

Japanese Unexamined Patent Application Publication No. 2008-83450 discloses an electrophoretic display device configured to control brightness of each pixel by attracting negatively charged white floating particles or positively charged black floating particles to the electrode of the upper substrate under control of the voltage applied thereto so as to generate images.

The electrophoretic display device according to the present invention is configured to have a flat electrode to which the black floating particle is adhered for black display and a partition electrode to which the black floating particle is adhered for white display for each pixel so as to generate the images.

For the display which includes the flat electrode to which the black floating particle is adhered for black display, and the partition electrode to which the black floating particle is adhered for the white display for each pixel so as to generate the image, it is necessary to make the partition electrode area the same as the flat electrode area in order to give sufficient memory property to the image.

Once the floating particle adheres to the flat electrode or the partition electrode, the electrophoretic display device exhibits the memory effect so that its state is retained even if application of the voltage to the respective electrodes is interrupted. Unlike the liquid crystal display device, the electrophoretic display device is not required to keep the pixel electrode at the predetermined voltage for retaining the predetermined state, thus being advantageous in view of power consumption.

For giving the device sufficient memory property, the partition electrode area has to be the same as the flat electrode area. For this, height of the partition has to be increased. If the partition height is increased, its strength may be insufficient, thus requiring increase in the partition width. That is, the partition configured to define the distance between the TFT substrate and the sealing substrate is required to exhibit predetermined strength. If the partition width is increased, the occupancy of the flat electrode for generating the image in each pixel is reduced, resulting in deteriorated screen brightness. Japanese Unexamined Patent Application Publication No. 2007-47208 does not disclose the problem relevant to the flat electrode area and the partition electrode area.

SUMMARY OF THE INVENTION

The present invention provides an electrophoretic display device which maintains good memory property for each pixel while retaining brightness.

The present invention solves the above problem, and the specific structure of the device will be described hereinafter.
(1) The electrophoretic display device includes a pixel formed by sealing an insulating fluid and a floating particle in a region defined by a first substrate, a second substrate and a partition. A flat electrode is formed on a surface of the first substrate opposite the insulating liquid, and a partition electrode is formed on a surface of the partition opposite the insulating liquid. An image is displayed at a voltage applied between the flat electrode and the partition electrode. The partition has a surface formed to have a zigzag shape in a planar view. This makes it possible to make the partition electrode area large.
(2) The present invention provides another structure configured to form the partition into a concave-convex shape in a planar view for increasing the partition electrode area. Alternatively, the partition electrode area may be increased by forming the partition into a convex shape at the side of the insulating liquid in a planar view.
(3) The present invention provides the device configured to form the pixel surrounded by the partition into a rectangular shape to make the partition electrode area relatively larger than the one when the pixel has a square surface in a planar view. It is effective by making the long side of the rectangle equal to or three or more times longer than the short side. The partition electrode area may further be increased by combining the structures as described in (1) and (2) with the pixel with a rectangular planar surface.

The present invention is capable of reducing the partition width so as to improve brightness or transmittance of each pixel, thus providing the electrophoretic display device with high brightness. In other words, the present invention allows the partition electrode area to be the same as the flat electrode area in spite of reduced partition height accompanied with reduction in the partition width. This makes it possible to allow the electrophoretic display device to retain its memory effect.

DESCRIPTION OF THE PREFERRED EMBODIMENTS

Examples according to the present invention will be described hereinafter.

Example 1

Figure 1:
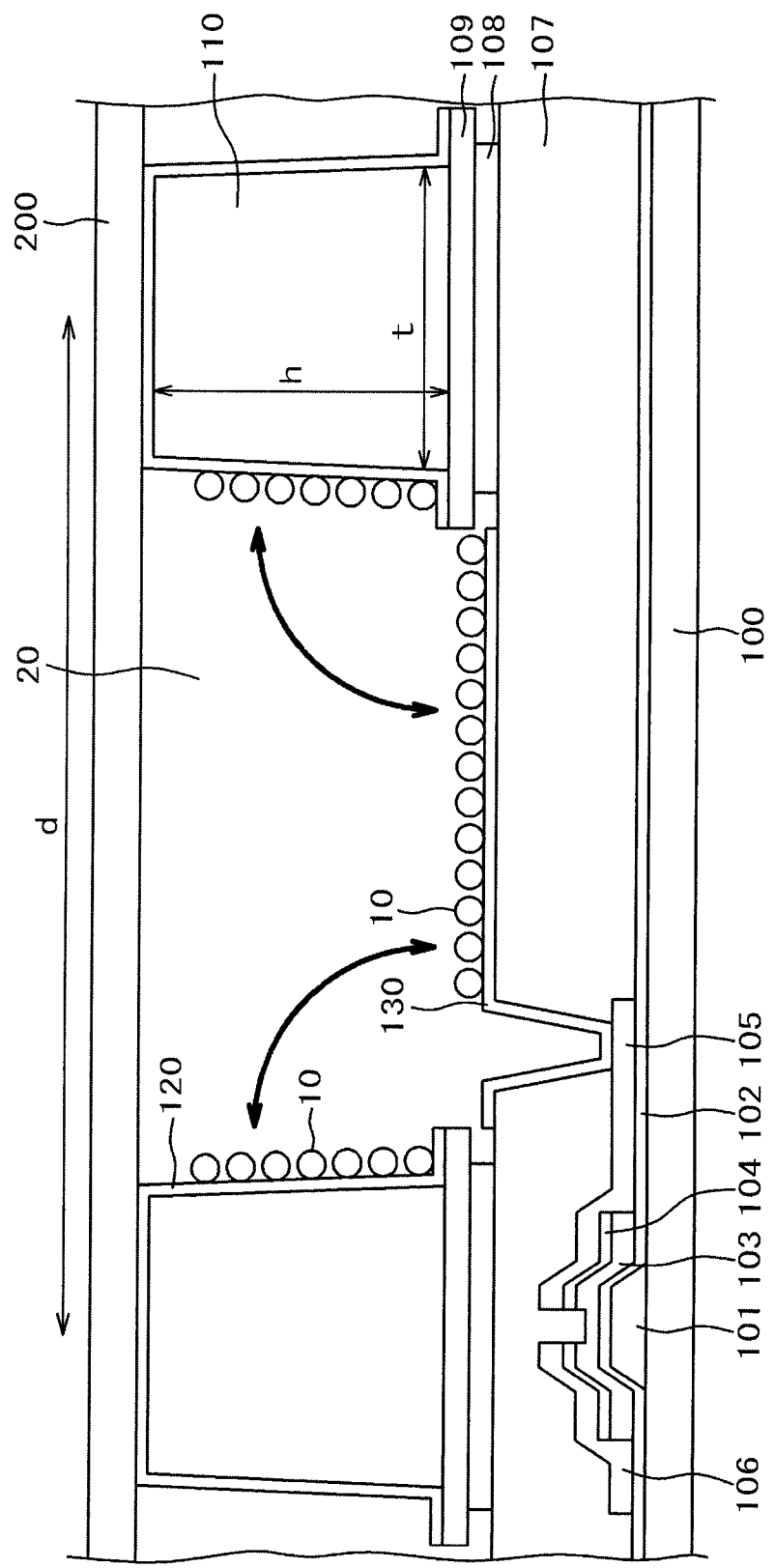
FIG. 1 is a sectional view of an electrophoretic display device.

FIG. 1 is a sectional view of a pixel of an electrophoretic display device according to the present invention. Referring to FIG. 1, the pixel is separated from the adjacent pixels by partitions 110. As FIG. 1 shows, an insulating liquid 20 is sealed in a region defined by a TFT substrate 100 having a thin film transistor (TFT) formed for switching, the partitions 110 and a sealing substrate 200. The insulating liquid 20 has black floating particles 10 dispersed so as to adhere to a flat electrode 130 or a partition electrode 120 depending on a potential correlation therebetween as shown by arrows, thus determining brightness for each pixel.

Arbitrary material may be used for forming the insulating liquid 20 such as Si oil so long as it exhibits insulating property. A black particle, for example, carbon black, aniline black and the like is used for forming the floating particle 10. Each particle size is set to be approximately in the range from 0.2 µm to 2 µm. The floating particles 10 may be colored as desired conforming to the color display.

Referring to FIG. 1, the TFT is formed on the TFT substrate 100 for switching operation so as to write a video signal to each pixel. As FIG. 1 shows, the TFT substrate 100 of bottom gate type is used as the TFT. However, the TFT of top gate type may also be used. In FIG. 1, a gate electrode 101 is formed on the TFT substrate 100 which is formed of a glass. The gate electrode 101 may be formed of MoW, for example.

A gate insulating film 102 formed of a SiN film is applied to coat the gate electrode 101. The SiN film is formed through CVD, for example. An a-Si film formed through the CVD as a semiconductor layer is applied on the gate insulating film 102. An n-type Si is formed on the a-Si film in order to make an ohmic contact with a source electrode 105 or a drain electrode 106. An n-type Si layer 104 and an a-Si layer 103 are subjected to dry etching into patterns. The source electrode 105 and the drain electrode 106 are formed on the portion corresponding to the n-type Si. The source electrode 105 is connected to the flat electrode 130, and the drain electrode 106 is connected to the video signal line.

An organic passivation film 107 is formed to coat the source electrode 105 and the drain electrode 106. The organic passivation film 107 has a large thickness in the range from approximately 2 µm to 3 µm as it functions as a planarizing film. An inorganic passivation film formed of SiN and the like may be formed between the organic passivation film 107 and the source electrode 105 or the drain electrode 106.

The flat electrode 130 formed of the n-type Si is applied on the organic passivation film 107. Through holes formed in the organic passivation film 107 serve to connect the flat electrode 130 to the source electrode 105. The flat electrode 130 may be formed not only of the re-type Si but also ITO as the transparent electrode. The n-type Si may be formed through the CVD. The metal electrode may also be used for forming the flat electrode 130. Use of the transparent electrode as the flat electrode 130 provides the display device of transmission type using backlight. Use of the metal electrode with high reflectance as the flat electrode 130 provides the display device of reflection type.

Referring to FIG. 1, the partitions 110 are formed around the flat electrode 130. Before formation of the partition 110, SiN is used to form an upper insulating film 108 of approximately 500 nm in thickness. A common wiring 109 is formed on the upper insulating film 108. The common wiring 109 is formed of Al or Al alloy with low resistance. The common wiring 109 which extends to reach the terminal serves to apply common voltage to the partition electrode 120. The TFT substrate 100 has video signal lines connected to the drain electrode 106 extending in a longitudinal direction of the planar surface of the substrate and arranged in a horizontal direction, and the common wiring 109 extending in a horizontal direction of the planar surface of the substrate and arranged in the longitudinal direction.

Referring to FIG. 1, the resin partition 110 of 20 µm in height is formed on the common wiring 109. The partition 110 serves to define the distance between the TFT substrate 100 and the sealing substrate 200, and accordingly, is required to have predetermined mechanical strength. The partition 110 needs to have a predetermined width for retaining the predetermined mechanical strength. In FIG. 1, the partition 110 has a width t of 20 µm.

The partition 110 is formed of a photosensitive resin such as acrylic material. For the photosensitive resin of positive type, for example, only the portion exposed to light becomes soluble in a developer. This makes it possible to perform patterning without using the photoresist. The photographic resin of negative type has a mechanism opposite the positive type.

The partition electrode 120 is formed of n-type Si, for example, which coats the partition 110. Both the partition electrode 120 and the flat electrode 130 may be simultaneously produced using the n-type Si through the CVD. Referring to FIG. 1, the upper insulating film 108 below the common wiring 109 to which the partition electrode 120 is applied is subjected to side etching with respect to the common wiring 109. As the upper insulating film 108 is subjected to the side etching, the simultaneously produced n-type Si film is automatically separated into the partition electrode 120 formed on the partition 110 or the common wiring 109, and the flat electrode 130 formed on the organic passivation film 107.

In the above-formed pixel, the video signal supplied via the TFT allows the floating particles 10 to adhere to the flat electrode 130 or the partition electrode 120 so as to control the transmittance or brightness for each pixel. The voltage in the range from 10 V to 20 V is applied between the flat electrode 130 and the partition electrode 120 so as to control migration of the floating particles 10.

Referring to FIG. 1, the pixel is defined between centers of the adjacent partitions 110. In this example, the horizontal dimension d of the pixel is 100 µm as shown in FIG. 1, and the longitudinal dimension not shown in FIG. 1 is also 100 µm. In the other example, the longitudinal dimension is different from the horizontal dimension.

For the explanatory purpose, each upper surface of the flat electrode 130 and the partition electrode 120 is covered with a single layer of the floating particles 10 in FIG. 1. Actually, however, the floating particles 10 will adhere to either the flat electrode 130 or the partition electrode 120 depending on the potential correlation therebetween. In the electrophoretic display device, once the floating particles 10 adhere to the electrode, its state is maintained without applying the voltage to the electrode until the next signal is supplied. This phenomenon is called memory effect. The memory effect allows the electrophoretic display device to reduce the power consumption.

It is preferable to make the area of the flat electrode 130 the same as that of the partition electrode 120 in order to sufficiently bring out the memory effect. In the case where the floating particles 10 adhere to the flat electrode 130 or the partition electrode 120, it is preferable to allow adhesion of the floating particles 10 in a single layer.

Referring to FIG. 1, supposing that the pixel has a size of 100 μm×100 μm, and the partition 110 has the width of 20 μm, the area of the flat electrode 130 is obtained by calculating the formula of 80 μm×80 μm=6400 μm². Meanwhile, supposing that the partition 110 has the height of 20 μm, the area of the partition electrode 120 is obtained by the equation of 4×80 μm×20 μm=6400 μm². The area of the flat electrode 130 is the same as that of the partition electrode 120. However, of the pixel area, that is, 100 μm×100 μm=10000 μm², only 6400 μm² is usable as the area for the display.

When increasing the area of the flat electrode 130 for enlarging the display area while keeping the pixel area constant, the area of the partition electrode 120 has to be increased as well for ensuring the memory effect. Then the height of the partition 110 has to be increased, which may cause the problem of its mechanical strength. Conventionally, enlargement of the flat electrode 130 for each pixel has been restricted.

Figure 2:
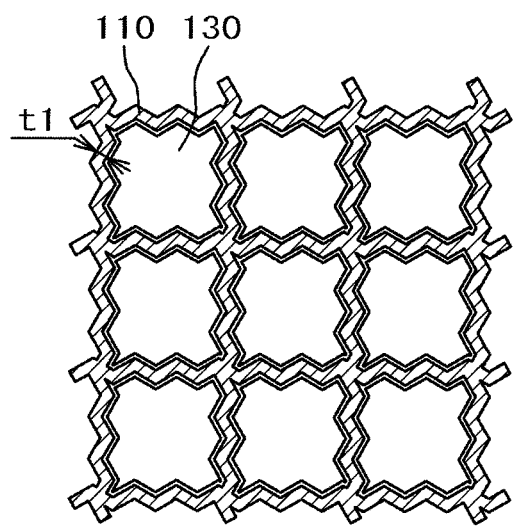
FIG. 2 is a plan view illustrating a partition configuration according to Example 1.

FIG. 2 is a plan view illustrating the configuration of nine pixels according to the present invention, which is designed to solve the aforementioned problem. Actually, the display device has a large number of pixels arranged in matrix to form a display region. FIG. 2 shows the pixels, each of which is defined by the partitions 110 each with a zigzag shape. The flat electrode 130 is formed inside the area defined by the partitions 110. Since the partition 110 is formed to have the zigzag shape, its area is increased. This makes it possible to increase the area of the partition electrode 120 without increasing the height of the partition 110. Since the structure also reduces the height of the partition 110, its width may be reduced as well. This makes it possible to increase the area of the flat electrode 130, thus improving brightness.

Figure 4:
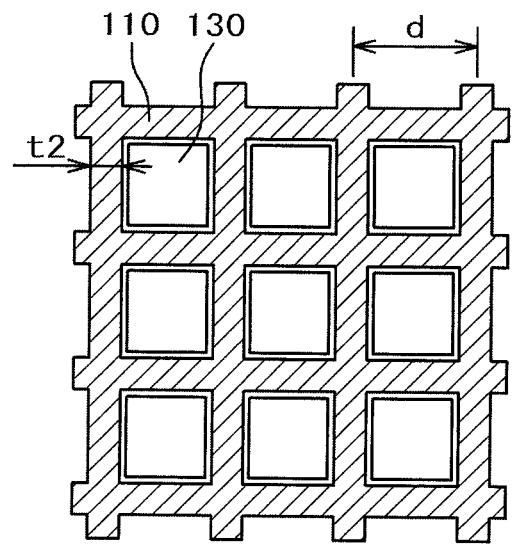
FIG. 4 is a plan view illustrating a configuration of a generally employed partition.

FIG. 4 is a plan view of the generally employed pixel electrode. Referring to FIG. 4, one side of the pixel has a length d of 100 μm, and the partition 110 has a width of 20 μm. In this case, the area of the flat electrode 130 is 6400 μm², which is 64% of the pixel area. Supposing that the width of the partition 110 is reduced to 10 μm, the area of the flat electrode 130 is 8100 μm², which is larger than the area obtained when the partition 110 has the width of 20 μm, that is, by the amount corresponding to 81/64=1.27. This makes it possible to intensify the brightness by 27%.

Figure 3:
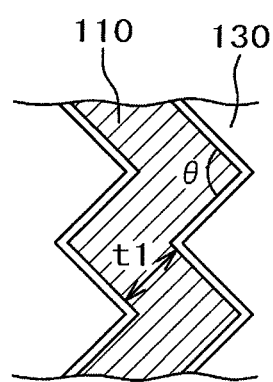
FIG. 3 is a plan view illustrating a detailed configuration of the partition according to Example 1.

If the width of the partition 110 is simply reduced, its strength may be deteriorated. According to the present invention, the partition 110 is formed into the zigzag shape as shown in FIG. 2 so as to ensure the required area of the partition electrode 120 in spite of reduced height of the partition 110. FIG. 3 is an enlarged plan view of the partition 110 shown in FIG. 2. When the height of the partition 110 is reduced from 20 μm to 15 μm, the area of the flat electrode 130 may be the same as that of the partition electrode 120 by setting the angle θ shown in FIG. 3 to 102.2°. When the height of the partition 110 is further reduced to 13 μm, the area of the flat electrode 130 may be the same as that of the partition electrode 120 by setting the angle θ shown in FIG. 3 to 70.6° while having the partition 110 formed into the zigzag shape.

The zigzag shaped partition 110 may enlarge its cross-section compared to the case where the partition 110 has a linear shape in spite of the same width. Then proof strength that bears pressures of two substrates applied from above and below, respectively may be enhanced. From the aforementioned point of view, zigzag shaped partition 110 is advantageous.

Figure 5:
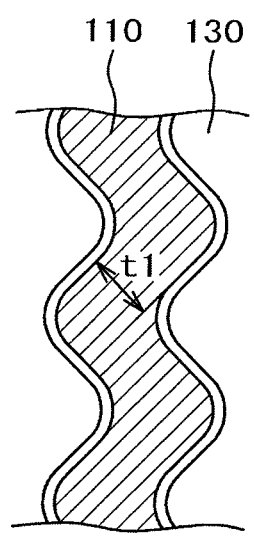
FIG. 5 is a plan view illustrating another configuration of the partition according to Example 1.

Referring to FIGS. 2 and 3, the partition 110 has the zigzag shape to increase the area of the partition electrode 120. However, the same effect may be obtained by forming the partition electrode into a snake-like shape with rounded tops as shown in FIG. 5 rather than the zigzag shape.

Example 2

Figure 6:
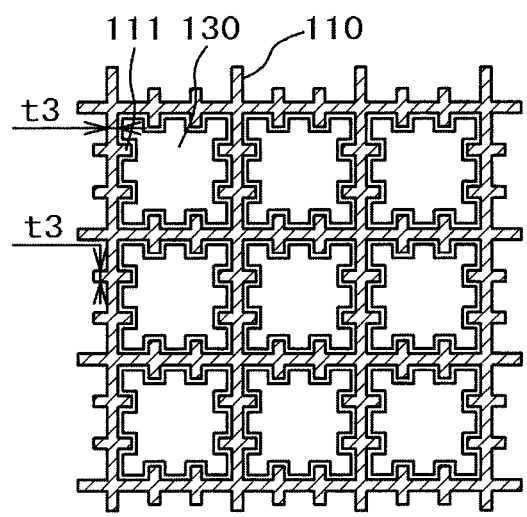
FIG. 6 is a plan view illustrating a configuration of a partition according to Example 2.

FIG. 6 is a plan view of pixels according to Example 2. Referring to FIG. 6, the partition 110 has protrusions which may increase its effective area. As FIG. 6 shows, each width of the protrusion and the partition 110 is set to the same value of t3. The partition electrode 120 is applied to the protrusion. The cross-section structure of the pixel is basically the same as the one shown in FIG. 1. This example is capable of increasing the effective area of the partition electrode 120 as a whole in spite of reduced height of the partition 110. This makes it possible to make the area of the flat electrode 130 the same as that of the partition electrode 120, which allows the electrophoretic display device to retain the memory effect. The resultant display device has lower power consumption and high contrast.

Figure 7:
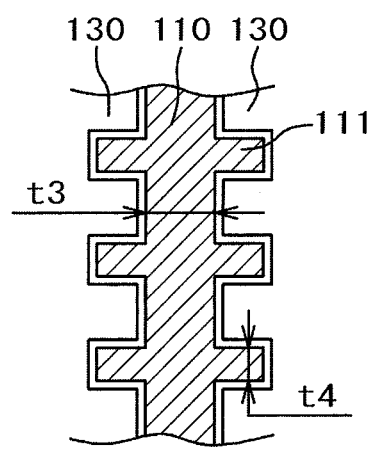
FIG. 7 is a plan view illustrating another configuration of the partition according to Example 2.

As FIG. 6 shows, the protrusion has the same width as that of the partition 110. However, the width of the protrusion does not have to be necessarily the same as that of the partition 110. FIG. 7 illustrates a modified example having a width t4 of a protrusion 111 smaller than a width t3 of the partition 110. This makes it possible to form more protrusions, thus allowing easy increase in the area of the partition electrode 120. This may easily make the area of the flat electrode 130 the same as that of the partition electrode 120.

Figure 8:
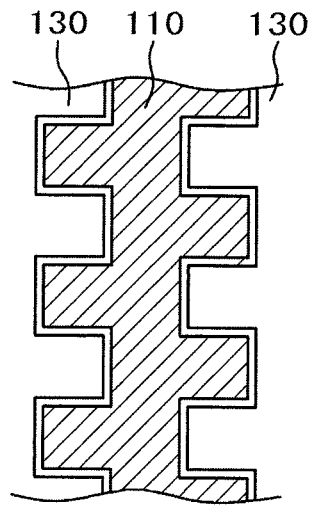
FIG. 8 is a plan view illustrating still another configuration of the partition according to Example 2.

FIG. 8 illustrates another modified example, having the flat surface of the partition 110 cranked. This structure may also increase the area of the partition electrode 120. The structure shown in FIG. 8 makes it possible to keep the width of the partition 110 substantially the same in most of the region, thus providing excellent mechanical stability.

In the aforementioned example, the protrusion of the partition 110 has a rectangular shape in a planar view. However, it does not have to have the rectangular shape for increasing the area of the partition electrode 120. For example, the similar effect may be obtained by forming the shape into a triangle, a circle and the like, for example.

The example makes it possible to make the area of the flat electrode 130 the same as that of the partition electrode 120 in spite of reduced height of the partition 110. This may keep the width of the partition 110 small, and improve brightness for each pixel.

Example 3

According to Examples 1 and 2, the partition 110 is formed to have the zigzag shape, or provided with the protrusions, respectively so as to substantially increase the area of the partition electrode 120. The resultant structure makes it possible to make the area of the flat electrode 130 the same as that of the partition electrode 120 in spite of the reduced height of the partition 110.

Figure 9:
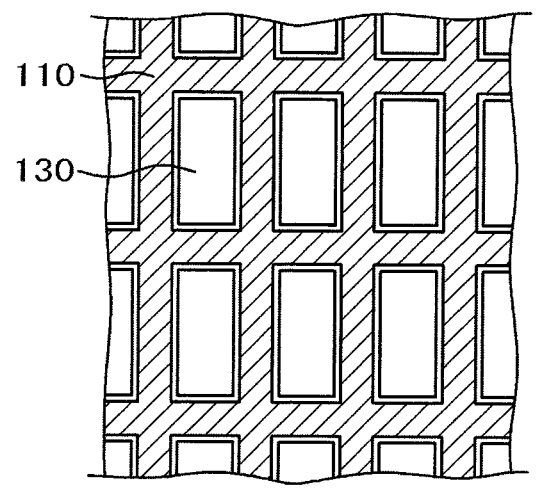
FIG. 9 is a plan view illustrating a configuration of a partition according to Example 3.

The structure according to this example easily allows the area of the flat electrode 130 to be the same as that of the partition electrode 120 without making the complicated shape as described in Examples 1 and 2. FIG. 9 is a plan view of the pixel structure according to the example. The pixel structure shown in FIG. 9 having the rectangular planar shape is different from the one shown in FIG. 4 having the square planar shape.

In order to make the area of the flat electrode 130 the same as that of the partition electrode 120 in spite of the reduced height of the partition 110, it is necessary to establish the structure having the area of the partition electrode 120 as large as possible. If the area of the flat electrode 130 is kept the same, the aspect ratio of the rectangular flat electrode 130 is made as large as possible so that the ratio between the circumferential length and the area is increased. In the example, the pixel is formed to have the rectangular planar shape to increase the area of the partition electrode 120 using the aforementioned principle.

Supposing that the aspect ratio of the rectangular pixel is set to 1:4, the area of the partition electrode 120 may be made larger than that of the partition electrode 120 when the pixel has the square shape in a planar view by 1.25 times (10/8). This means that the width of the partition 110 may be reduced by the corresponding amount, thus improving transmittance or brightness of the pixel.

FIG. 9 shows the vertically long pixel. However, the present invention applies to the horizontally long pixel in the same manner. In this example, the height of the partition electrode 120 may be reduced without forming the partition 110 into the complicated shape. This makes it possible to reduce the width of the partition 110, thus improving transmittance or brightness of the pixel. The aspect ratio (long side/short side) of the rectangle of 3/1 or larger may provide the remarkable effects. In principle, it is preferable to make the aspect ratio as high as possible. The upper limit of the aspect ratio is determined depending on how easy it is to produce the electrophoretic display device.

Figure 10:
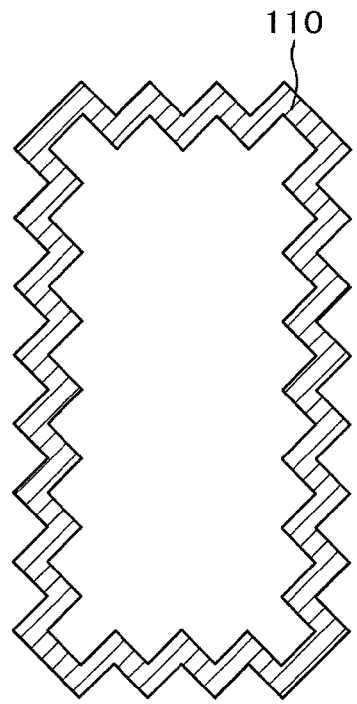
FIG. 10 is a plan view illustrating another configuration of the partition according to Example 3.

FIG. 10 is a plan view of another example, which only illustrates the partition 110 of the single pixel. FIG. 10 shows a structure formed by combining the zigzag-shaped partition 110 according to Example 1 and the rectangular pixel according to this example. The example is combined with the partition 110 according to Example 1 makes it possible to further increase the area of the partition 110. Then the height of the partition 110 may be reduced, thus further improving transmittance or brightness of the pixel.

FIG. 10 shows the structure formed by combining Example 1 with the rectangular pixel according to this example. However, the example may be combined with the partition 110 with the shape according to Example 1 as shown in FIG. 5, or with the one having the protrusion according to Example 2 as shown in FIGS. 6, 7 and 8. This makes it possible to increase the area of the partition electrode 120 more efficiently.

The example shown in FIG. 10 makes the area of the partition electrode 120 large by combining the rectangular pixel with the structure with the configuration according to Example 1 or 2. Meanwhile, the effect for enlarging the partition electrode 120 is enhanced by applying the configuration as shown in FIG. 2 to the long side of the rectangular pixel, and manufacturing is easy.

Figure 11:
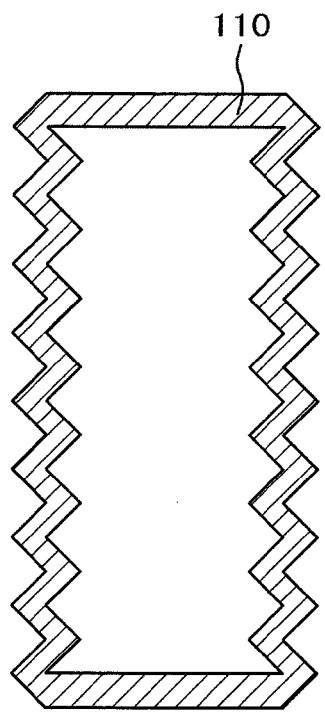
FIG. 11 is a plan view illustrating still another configuration of the partition according to Example 3.

FIG. 11 illustrates the rectangular pixel according to this example, which has the long sides each with the shape of the partition 110 according to Example 1. FIG. 11 only illustrates the partition 110. Likewise, the effect of increasing the area of the partition electrode 120 may be obtained by applying, to the long sides of the rectangular pixel, the configuration according to Example 1 as shown in FIG. 5, and the configuration according to Example 2 as shown in FIGS. 6, 7 and 8.

According to Examples 1 to 3, the area of the flat electrode 130 is the same as that of the partition electrode 120. Those areas do not have to be exactly the same. Supposing that the area of the flat electrode 130 is designated as A, and the area of the partition electrode 120 is designated as B, sufficient memory property may be retained so long as B is 90% of A or more. The area of the partition electrode 120 denotes the area where it faces the insulating liquid as shown in FIG. 1.

Japanese Unexamined Patent Application Publication No. 2008-83450 discloses the structure having a part of the partition 151 formed into the zigzag shape in a planar view as shown in FIG. 13. The electrophoretic display device shown in FIG. 13 is structured based on the operating principle which is totally different from that of the electrophoretic display device according to the present invention. The zigzag-shaped partition 151 in the document is made for the purpose different from that of the present invention. In other words, the electrophoretic display device disclosed in Japanese Unexamined Patent Application Publication No. 2008-83450 forms the surface electrode on the upper substrate, and the back electrode on the lower electrode so that negatively charged black particles or positively charged white particles are attracted to all the substrates to display the image.

As disclosed in Japanese Unexamined Patent Application Publication No. 2008-83450, the partition 151 is partially formed to have the zigzag shape so as to suppress the phenomenon that the particles attracted to the back electrode are seen from the gap through the particles attracted to the surface electrode. On the contrary, according to the present invention, the floating particles 10 of just one type are employed in the pixel. The floating particles 10 are attracted to the flat electrode 130 on the TFT substrate 100 or the partition electrode 120 on the partition 110 to generate the image. The partition 110 is formed to have the zigzag shape so as to retain the memory effect of the electrophoretic display device by increasing the area of the partition electrode 120. Meanwhile, the structure disclosed in Japanese Unexamined Patent Application Publication No. 2008-83450 has no partition electrodes. Therefore the structure according to the present invention is totally different from the one disclosed in Japanese Unexamined Patent Application Publication No. 2008-83450.

What is claimed is:

1. An electrophoretic display device which includes a pixel formed by sealing an insulating fluid and a floating particle in a region defined by a first substrate, a second substrate and a partition,
    wherein a flat electrode is formed on a surface of the first substrate opposite the insulating liquid, and a partition electrode is formed on a surface of the partition opposite the insulating liquid;
    an image is displayed at a voltage applied between the flat electrode and the partition electrode; and
    the partition has a surface formed to have a zigzag shape in a planar view.

2. The electrophoretic display device according to claim 1, wherein an area of the flat electrode is 90% of an area of the partition electrode or larger.

3. An electrophoretic display device which includes a pixel formed by sealing an insulating fluid and a floating particle in a region defined by a first substrate, a second substrate and a partition, wherein a flat electrode is formed on a surface of the first substrate opposite the insulating liquid, and a partition electrode is formed on a surface of the partition opposite the insulating liquid;

an image is displayed at a voltage applied between the flat electrode and the partition electrode; and the partition is provided with a concavo-convex shape at a side of the insulating liquid in a planar view.

4. The electrophoretic display device according to claim 3, wherein an area of the flat electrode is 90% of an area of the partition electrode or larger.

* * * * *